United States Patent [19]

Terada

[11] Patent Number: 4,576,412
[45] Date of Patent: Mar. 18, 1986

[54] SEAT RECLINING MECHANISM

[75] Inventor: Takami Terada, Toyota, Japan

[73] Assignees: Aisin Seiki Kabushiki Kaisha; Toyota Jidosha Kabushiki Kaisha, both of Japan

[21] Appl. No.: 711,648

[22] Filed: Mar. 14, 1985

[30] Foreign Application Priority Data

Mar. 15, 1984 [JP] Japan .................................. 59-50718

[51] Int. Cl.$^4$ ............................................. B60N 1/02
[52] U.S. Cl. .................................... 297/362; 297/354; 297/355
[58] Field of Search ............... 297/362, 354, 355, 366, 297/367

[56] References Cited

U.S. PATENT DOCUMENTS

| 3,972,563 | 8/1976 | Gustafsson | 297/355 |
| 3,976,327 | 8/1976 | Wirtz et al. | 297/366 |
| 4,181,357 | 1/1980 | Swenson | 297/362 |
| 4,195,884 | 4/1980 | Muhr et al. | 297/362 |
| 4,335,917 | 6/1982 | Izuno et al. | 297/354 X |

OTHER PUBLICATIONS 58-1255 01001983 JPX

*Primary Examiner*—James T. McCall

*Attorney, Agent, or Firm*—Finnegan, Henderson, Farabow, Garrett & Dunner

[57] ABSTRACT

A seat reclining mechanism comprising an upper bracket adapted to be secured to a seat back of a seat assembly, a lower bracket adapted to be secured to a seat cushion of the seat assembly, an internal gear provided on the upper bracket, an external gear provided on the lower bracket and adapted for meshing engagement with the internal gear the external gear being smaller in number of gear teeth than the internal gear. An eccentric shaft is provided and has a shaft portion journalling the external gear and an eccentric portion journalling the internal gear so that the gears are engaged with each other at a circumferential position. The eccentric shaft is journalled through a bearing on the lower bracket, and a manually operable knob shaft is rotatably carried by the lower bracket. A rotation transmitting mechanism is provided between the knob shaft and the eccentric shaft for transmitting rotation of the knob shaft to the eccentric shaft. A rotation restricting device is provided between the knob shaft and the lower bracket for restricting the knob shaft against rotation under a force applied from the eccentric shaft but permitting a rotation of the knob shaft under a manual actuating force directly applied thereto.

5 Claims, 4 Drawing Figures

FIG. 1
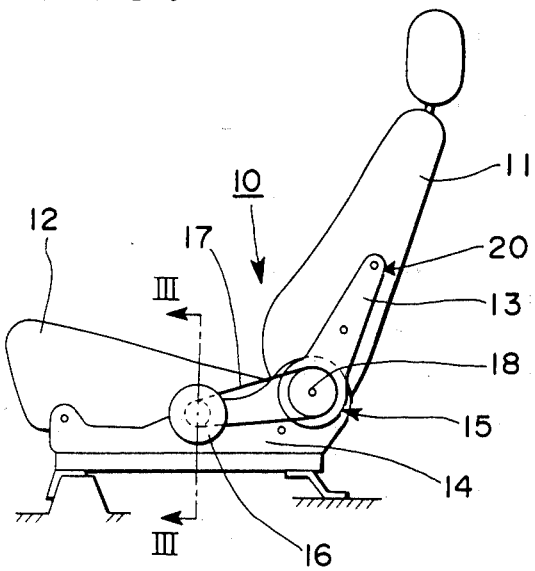
FIG. 3
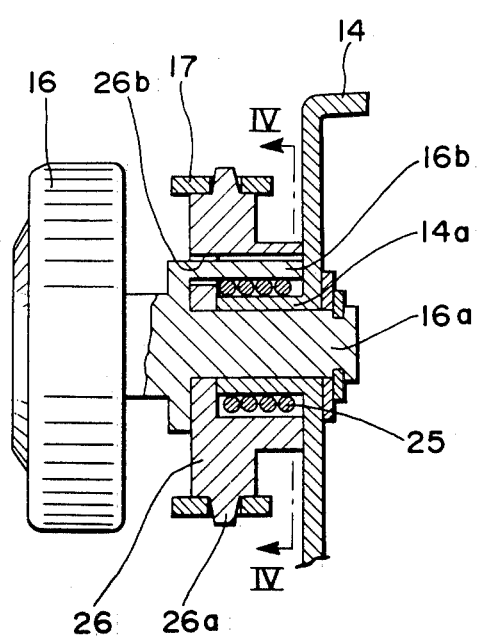
FIG. 4

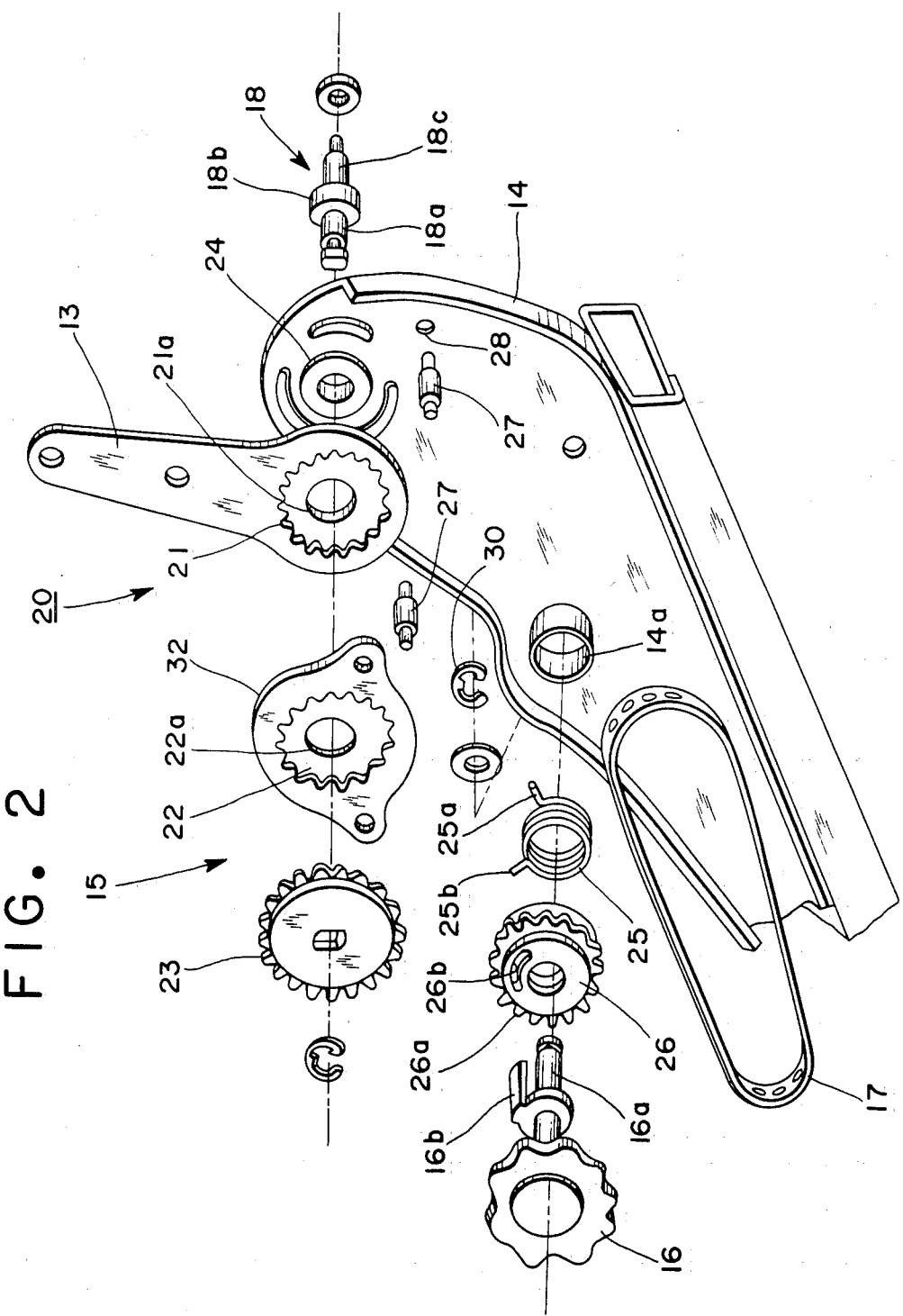

SEAT RECLINING MECHANISM

BACKGROUND OF THE INVENTION

1. Field of the Invention

The present invention relates to a seat reclining mechanism for automobiles and more particularly to a seat reclining mechanism having a reduction gear mechanism.

2. Description of Prior Art

Japanese Utility Model publication No. 58-1255 discloses a seat reclining mechanism having a reduction gear mechanism. The seat reclining mechanism is particularly applicable to a vehicle seat, especially to a passanger car seat and includes an upper bracket adapted to be secured to the seat back of a seat assembly and a lower bracket adapted to be secured to the seat cushion. Between the upper and lower brackets, there is provided a reduction gear mechanism through which the inclination angle of the upper bracket is adjusted. The reduction gear mechanism is comprised of an internal gear provided on the upper bracket and an external gear provided on the lower bracket and having gear teeth which are smaller in number at least by one than gear teeth in the internal gear. There is provided an eccentric shaft which carries the internal and external gears in an eccentric relationship so that the external gear is engaged with the internal gear at a circumferential position. A rotation of the eccentric shaft causes a displacement of the circumferential position of the engagement between the internal and external gears to thereby produce a relative rotation of the internal gear with respect to the external gear. This will cause a change in the inclination angle of the upper bracket with respect to the lower bracket.

In the seat reclining mechanism proposed by the Japanese utility model, the reduction gear mechanism has a large reduction gear ratio so that the position of the upper bracket can be maintained mostly by the friction between the eccentric shaft and the gears. It will therefore be understood that there is a substantial amount of friction between the eccentric shaft and the gears and a substantial actuating force is required to rotate the eccentric shaft.

OBJECT OF THE INVENTION

It is therefore an object of the present invention to provide a seat reclining mechanism which can be operated with a relatively small actuating force.

Another object of the present invention is to provide a seat reclining mechanism having a reduction gear mechanism actuated by an eccentric shaft, in which the eccentric shaft is journalled so that the actuating force can be substantially decreased but means is provided for maintaining the position of the upper bracket against the force applied to the seat back of the seat assembly.

SUMMARY OF THE INVENTION

According to the present invention, the above and other objects can be accomplished by a seat reclining mechanism comprising an upper bracket adapted to be secured to a seat back of a seat assembly, a lower bracket adapted to be secured to a seat cushion of the seat assembly, an internal gear provided on one of said upper and lower brackets, an external gear provided on the other of the upper and lower brackets and adapted for meshing engagement with said internal gear, said external gear being smaller in number of gear teeth than said internal gear, an eccentric shaft having a shaft portion journalling one of said gears and an eccentric portion journalling the other of said gears so that the gears are engaged with each other at a circumferential position, said eccentric shaft being journalled through bearing means on said other of said brackets, a manually operable knob shaft rotatably carried by said other bracket, rotation transmitting means between said knob shaft and said eccentric shaft for transmitting rotation of said knob shaft to said eccentric shaft, rotation restricting means provided between said knob shaft and said other bracket for restricting said knob shaft against rotation under a force applied from said eccentric shaft but permitting a rotation of said knob shaft under a manual actuating force directly applied thereto.

According to the features of the present invention, the eccentric shaft can be rotated without any significant frictional force so that the inclination angle of the seat back can be adjusted with a small actuating force. Any external load applied from the seat back to the reclining mechanism can be resisted by the restraining means so that it is possible to maintain the inclination angle of the seat back without increasing the reduction gear ratio of the gear mechanism. It is therefore possible to make the reducton gear mechanism compact in decreasing the actuating force.

BRIEF DESCRIPTION OF THE DRAWINGS

FIG. 1 is a side view of a seat assembly embodying the features of the present invention;

FIG. 2 is an exploded perspective view of the seat reclining mechanism employed in the seat assembly in FIG. 1;

FIG. 3 is a sectional view taken substantially along the line III—III in FIG. 1; and, FIG. 4 is a sectional view taken substantially along the line IV—IV in FIG. 3.

DESCRIPTION OF THE PREFERRED EMBODIMENT

Referring to the drawings, particularly to FIG. 1, there is shown an automobile seat assembly 10 which includes a seat back 11 and a seat cushion 12. Between the seat back 11 and the seat cushion 12, there is provided an adjustable reclining mechanism 20 including a reduction gear mechanism 15. The adjustable reclining mechanism 20 further includes an upper bracket 13 secured to the seat back 11 and a lower bracket 14 secured to the seat cushion 12. The reduction gear mechanism 15 is provided between the upper and lower brackets 13 and 14 and includes, as shown in FIG. 2, an internal gear 21 formed by pressing in the upper bracket 13 and a plate 32 formed by pressing with an external gear 22. The plate 32 is secured to the lower bracket 14 by means of pins 27. The external gear 22 has gear teeth which are smaller in number at least by one than the gear teeth in the internal gear 21 and is in meshing engagement with the internal gear 21.

There is provided an eccentric shaft 18 which has coaxial shaft portions 18a and 18c and an eccentric shaft portion 18b between the shaft portions 18a and 18c. The shaft portion 18a is fitted to an axial bore 22a formed in the external gear 22, whereas the eccentric shaft portion 18b is fitted to an axial bore 21a formed in the internal gear 21. It will be understood that the eccentric shaft 18 functions to hold the gears 21 and 22 in an eccentric relationship so that they are maintained in a meshing engagement at a circumferential position. The eccentric shaft 18 is journalled at the shaft portion 18c on the lower bracket 14 through a bearing 24 so that the eccentric shaft 18 is rotatable with respect to the lower bracket 14 without any remarkable frictional resistance. It will be noted that a rotation of the eccentric shaft 18 causes a circumferential displacement of the position of the meshing engagement between the gears 21 and 22 producing a relative rotation between the gears 21 and 22. Although not shown in the drawings, bearings may be provided respectively between the eccentric shaft portion 18b of the eccentric shaft 18 and the axial bore 21a of the internal gear 21 and between the shaft portion 18a of the shaft 18 and the axial bore 22a of the external gear 22.

There is provided a manually actuatable knob 16 having a knob shaft 16a which rotatably carries a driving wheel 26 having a drive gear 26a formed integrally therewith. The knob shaft 16a is rotatably supported by a bearing bush 14a provided on the lower bracket 14. The eccentric shaft 18 carries at one end a driven gear 23 which is secured to the eccentric shaft 18 so as to rotate therewith. A belt 17 is provided to connect the drive gear 26a with the driven gear 23 so that a rotation of the drive gear 26a is transmitted to the driven gear 23 to rotate the eccentric shaft 18.

Between the knob shaft 16a and the driving wheel 26, there is provided a spring coupler mechanism which functions as an anti-reverse mechanism. The coupler mechanism comprises as shown in FIGS. 3 and 4 an axially extending pawl 16b secured to the knob shaft 16a and an arcuate slot 26b formed in the driving wheel 26. The pawl 16b on the knob shaft 16a is slidably engaged with the arcuate slot 26b in the driving wheel 26. Referring to FIGS. 3 and 4, it will be noted that a coil spring 25 is provided between the driving wheel 26 and the bearing bush 14a on the lower bracket 14. The coil spring 25 is fitted to the external surface of the bearing bush 14a so that a certain degree of friction is produced therebetween. The coil spring 25 has opposite ends 25a and 25b which are respectively positioned in the spaces between the opposite ends of the pawl 16b and the opposite ends of the slot 26. Thus, a rotation of the knob 16 in either direction will cause either of the ends 25a and 25b be circumferentially forced by the pawl 16b producing a torsional deformation of the spring 25 so that the spring ends 25a and 25b are moved away from each other. This will cause a radial expansion of the coil springs 25 to thereby release the coil spring 25 from the frictional engagement with the outer surface of the bearing bush 14a. The pawl 16b is then allowed to move to a position wherein it engages either end of the slot 26b. A further rotation of the knob 16 then causes a rotation of the driving wheel 26. When the knob 26 is not actuated, the driving wheel 26 is restrained from rotation because the engagement between the slot and the spring 25 causes a radial shinkage of the spring 25 to thereby hold the spring 25 frictionally against rotation.

In operation, a rotation of the knob 16 causes a corresponding rotation of the driving wheel 26 in the manner described above. The rotation of the driving wheel 26 is then transmitted through the drive gear 26a and the belt 17 to the driven gear 23. Thus, the eccentric shaft 18 is rotated to circumferentially shift the position of engagement between the gears 21 and 22. As the result, the upper bracket 13 is inclined with respect to the lower bracket 14 causing a change in the inclination angle of the seat back. The rotation of the knob 16 is stopped when a desired inclination angle is attained to maintain the inclination angle. Since the eccentric shaft 18 is journalled by the bearing 24, it can be smoothly rotated with minimum effort applied to the knob 16.

When the seat back is subjected to load which tends to rotate the eccentric shaft 18, the spring 25 is radially shrunk in the manner previously described. Therefore, it is possible to prevent the seat back from being inclined further even though the eccentric shaft 18 is supported by a bearing.

The invention has thus been shown and described with reference to a specific embodiment, however, it should be noted that the invention is in no way limited to the details of the illustrated structures but changes and modifications may be made without departing from the scope of the appended claims.

I claim:

1. A seat reclining mechanism comprising an uppr bracket adapted to be secured to a seat back of a seat assembly, a lower bracket adapted to be secured to a seat cushion of the seat assembly, an internal gear provided on one of said upper and lower brackets, an external gear provided on the other of the upper and lower brackets and adapted for meshing engagement with said internal gear, said external gear being smaller in number of gear teeth than said internal gear, an eccentric shaft having a shaft portion journalling one of said gears and an eccentric portion journalling the other of said gears so that the gears are engaged with each other at a circumferential position, said eccentric shaft being journalled through bearing means on said other of said brackets, a manually operable knob shaft rotatably carried by said other braket, rotation transmitting means between said knob shaft and said eccentric shaft for transmitting rotation of said knob shaft to said eccentric shaft, rotation restricting means provided between said knob shaft and said other bracket for restricting said knob shaft against rotation under a force applied from said eccentric shaft but permitting a rotation of said knob shaft under a manual actuating force directly applied thereto.

2. A seat reclining mechanism in accordance with claim 1 in which said one braket is the upper bracket and the other bracket is the lower bracket.

3. A seat reclining mechanism in accordance with claim 1 which said rotation transmitting means includes a belt-gear mechanism.

4. A seat reclining mechanism in accordance with claim 1 in which said restricting means includes a coil spring frictionally engaging said other bracket for holding said knob shaft against rotation and means for releasing the coil spring from the frictional engagement with the other bracket when a manual actuating force is applied to the knob shaft.

5. A seat reclining mechanism in accordance with claim 1 in which said restricting means includes a bush provided on the other bracket for receiving the knob shaft, a coil spring normally maintained in a frictional engagement with an outer surface of the bush and having ends engageable with said knob shaft, said knob shaft being provided with pawl means for engagement with respective ends of said coil spring upon rotations in respective directions for producing a torsional deformation of said spring so that the spring is increased in diameter to thereby release the frictional engagement between the coil spring and the bush on the other bracket.

* * * * *